(12) United States Patent
Matoba

(10) Patent No.: US 7,390,585 B2
(45) Date of Patent: Jun. 24, 2008

(54) FUEL CELL SYSTEM

(75) Inventor: Tadashi Matoba, Yokosuka (JP)

(73) Assignee: Nissan Motor Co., Ltd., Kanagawa (JP)

(*) Notice: Subject to any disclaimer, the term of this patent is extended or adjusted under 35 U.S.C. 154(b) by 390 days.

(21) Appl. No.: 10/610,913

(22) Filed: Jul. 2, 2003

(65) Prior Publication Data
US 2004/0005487 A1 Jan. 8, 2004

(30) Foreign Application Priority Data
Jul. 5, 2002 (JP) ............................. 2002-197116

(51) Int. Cl.
*H01M 8/04* (2006.01)
(52) U.S. Cl. .............................. 429/24; 429/13; 429/22; 429/26
(58) Field of Classification Search .................... 429/17
See application file for complete search history.

(56) References Cited

U.S. PATENT DOCUMENTS

| | | | | |
|---|---|---|---|---|
| 3,991,783 A | * | 11/1976 | Krauss | 137/209 |
| 6,010,614 A | * | 1/2000 | Keskar et al. | 205/765 |
| 6,315,273 B1 | * | 11/2001 | Davies | 261/29 |
| 2001/0010872 A1 | | 8/2001 | Suzuki et al. | |
| 2001/0016276 A1 | | 8/2001 | Yamanashi | |
| 2001/0055707 A1 | | 12/2001 | Roberts et al. | |
| 2002/0091407 A1 | * | 7/2002 | Zadno-Azizi et al. | 606/200 |
| 2002/0106537 A1 | * | 8/2002 | Saito | 429/13 |
| 2002/0177022 A1 | * | 11/2002 | Shimonosono et al. | 429/24 |
| 2003/0143439 A1 | * | 7/2003 | Couch et al. | 429/13 |

FOREIGN PATENT DOCUMENTS

| | | |
|---|---|---|
| JP | 64-082464 | 3/1989 |
| JP | 6-223855 | 8/1994 |
| JP | 08-195211 | 7/1996 |
| JP | 09-147892 | 6/1997 |
| JP | 11-273704 | 10/1999 |
| JP | 11-273705 | 10/1999 |
| WO | WO 97/48142 | 12/1997 |
| WO | WO 00/65676 | 11/2000 |
| WO | WO 01/24296 A1 | 4/2001 |

* cited by examiner

*Primary Examiner*—Patrick Ryan
*Assistant Examiner*—Cynthia Lee
(74) *Attorney, Agent, or Firm*—McDermott Will & Emery LLP

(57) ABSTRACT

A fuel cell system is provided with a humidifying device (27, 28) for humidifying at least one of fuel gas and oxygen-bearing gas, a water passage (11) through which water from a water tank (5) flows, a water removing device (2, 3, 3a, 4) for supplying purge gas to the water passage in order to remove the water in the water passage, and a water recirculating device (8) for enabling water to flow through the water passage. The fuel cell system is also provided with a shutoff valve (7) for blocking the water passage such that water from the water tank does not flow into the water recirculating device, the shutoff valve (7) being provided between the water tank (5) and the water recirculating device (8). When a shutdown operation of the fuel cell system begins, a controller (48) controls the shutoff valve (7) to open and controls the water removing device (2, 3, 3a, 4) such that purge gas is supplied to the water passage. The controller (48) also controls the shutoff valve (7) to block the water passage after the water has been expelled from the water passage.

16 Claims, 13 Drawing Sheets

FUEL CELL SYSTEM

FIELD OF THE INVENTION

This invention relates to a fuel cell system, and more particularly to technology for preventing damage to the fuel cell system caused by the freezing of water inside the system in low temperature environments.

BACKGROUND OF THE INVENTION

A fuel cell system disclosed in Tokkai H6-223855, published by the Japanese Patent Office in 1994, is known in the prior art.

This system comprises a fuel cell for generating electric power by causing hydrogen gas and oxygen gas to electrochemically react, a cooling water recirculation passage through which cooling water for adjusting the temperature of the fuel cell is recirculated, and a gas forcing device for removing the cooling water from the cooling water recirculation passage. When operations in the fuel cell system are shut down, the gas forcing device removes the cooling water in the cooling water recirculation passage and stores the cooling water in a container on the outside of the cooling water recirculation passage. The gas forcing device supplies oxygen or air from a gas supply source for supplying the fuel cell with gas to the cooling water recirculation passage through an open/close valve. In this manner the water to be circulated in the cooling water recirculation passage during operation of the fuel cell system is prevented from freezing after a shutdown of the fuel cell system in the prior art.

SUMMARY OF THE INVENTION

In the prior art, however, the cooling water recirculation passage is disposed to extend upwards and downwards, and therefore cooling water may accumulate in the passage. As a result, the water may freeze in or around a water recirculation pump, a valve, and so on, causing damage to these components.

It is therefore an object of this invention to prevent water from freezing in the vicinity of the constitutional components of a water supply system or a water recirculation system.

In order to achieve above objects, this invention provides a fuel cell system having a fuel cell for generating electric power using fuel gas and oxygen-bearing gas. The fuel cell system comprises a humidifying device for humidifying at least one of the fuel gas and oxygen-bearing gas which are supplied to the fuel cell; a water tank for storing water used in the humidifying performed by the humidifying device; a water passage through which water from the water tank flows to the humidifying device; a water removing device for supplying purge gas to the water passage so as to remove the water in the water passage; a water recirculating device for enabling the passage of water through the water passage, the water recirculating device being disposed on the water passage; a shutoff valve for blocking the water passage such that water from the water tank does not flow into the water recirculating device, the shutoff valve being provided between the water tank and the water recirculating device; and a controller.

The controller is electrically connected to the water removing device, water recirculating device, and shutoff valve for controlling a shutdown operation of the fuel cell system. The controller functions to control the shutoff valve to open and control the water removing device to start a supply of purge gas to the water passage when a shutdown operation of the fuel cell system begins; and to control the shutoff valve to block the water passage after a predetermined time period has elapsed following the start of the supply of purge gas and control the water removing device to halt the supply of purge gas after the water passage has been blocked by the shutoff valve.

The details as well as other features and advantages of this invention are set forth in the remainder of the specification and are shown in the accompanying drawings.

DESCRIPTION OF THE PREFERRED EMBODIMENTS

Figure 1:
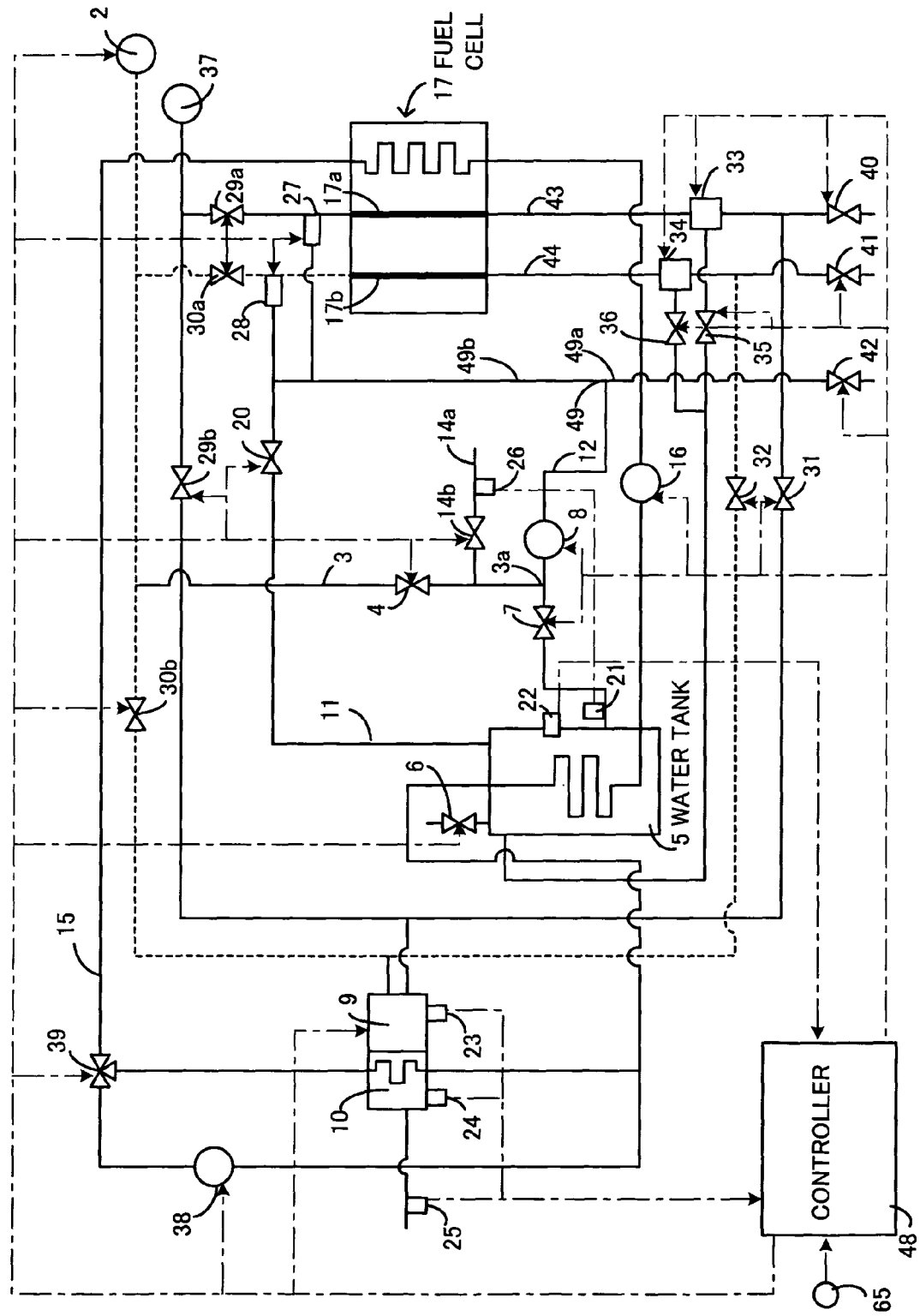
FIG. 1 is a schematic diagram of a fuel cell system according to a first embodiment.

FIG. 1 shows a fuel cell system used in a first embodiment.

Hydrogen gas from a hydrogen tank 37 and air from a compressor 2 are supplied respectively to an anode electrode 17a and a cathode electrode 17b of a fuel cell 17. An anode humidifying injector 27 serves as a humidifying device for injecting water into the hydrogen gas (i.e. fuel gas) in order to humidify the anode of the fuel cell 17. A cathode humidifying injector 28 serves as a humidifying device for injecting water into the air (i.e. oxygen-bearing gas) in order to humidify the cathode of the fuel cell 17. The water to be injected is stored in a water tank 5. A hydrogen control valve 29*a* and an air control valve 30*a* adjust the supply flow rate of the hydrogen gas and air respectively.

After power generation is performed in the fuel cell 17, effluent from each of the electrodes 17*a*, 17*b* flows to an anode passage 43 and a cathode passage 44. An anode gas/water separator 33 and a cathode gas/water separator 34 disposed respectively on the anode passage 43 and cathode passage 44 recover the moisture in the effluent. The surplus hydrogen gas discharged from the anode 17*a* is supplied to a combustor 9 via an anode effluent pressure adjustment valve 31 for adjusting the pressure of the anode effluent. Similarly, the gas discharged from the cathode 17*b* is supplied to the combustor 9 via a cathode effluent pressure adjustment valve 32 for adjusting the pressure of the cathode effluent.

The combustor 9 produces combustion gas using the effluent supplied from the fuel cell 17. The produced combustion gas is supplied to a heat exchanger 10 and used as a heat source. Having been used to heat coolant used in the cooling system of the fuel cell 17, the combustion gas is discharged out of the system. When the required amount of heat cannot be achieved in the combustor 9 by effluent alone, or when an electrochemical reaction does not take place in the fuel cell 17 during startup, hydrogen and air are supplied directly from the hydrogen tank 37 and compressor 2 to the combustor 9. The hydrogen which is supplied to the combustor 9 is adjusted by a hydrogen flow control valve 29*b* disposed on a pipe which is connected to the combustor 9 as a bifurcation from a pipe which extends from the hydrogen tank 37 to the fuel cell 17. The flow rate of air to the combustor 9 is adjusted by an air flow control valve 30*b* disposed on a pipe which is connected to the combustor 9 as a bifurcation from a pipe which extends from the compressor 2 to the fuel cell 17.

The water which is recovered from the effluent in the anode gas/water separator 33 and cathode gas/water separator 34 is collected inside the water tank 5 via an anode condensed water recovery valve 35 and a cathode condensed water recovery valve 36. The anode condensed water recovery valve 35 is used for controlling a flow of water from the anode gas/water separator 33 to the water tank 5. The cathode condensed water recovery valve 36 is used for controlling a flow of water from the cathode gas/water separator 34 to the water tank 5.

Next, the cooling system for adjusting the temperature of the fuel cell 17 will be described. The cooling system comprises a coolant passage 15 through which coolant is recirculated, a coolant pump 16 for recirculating the coolant, a coolant cooling device 38 for cooling the coolant, and the heat exchanger 10 for heating the coolant. The cooling system also comprises a coolant passage change-over valve 39 for switching between supplying coolant to the coolant cooling device 38 and to the heat exchanger 10. When the temperature of the fuel cell 17 rises above a predetermined temperature, a controller 48 switches the change-over valve 39 such that the temperature of the coolant is lowered in the coolant cooling device 38, and when the temperature of the fuel cell 17 falls below a predetermined temperature, a controller 48 switches the change-over valve 39 such that the temperature of the coolant is raised in the heat exchanger 10. A temperature sensor (not shown) which is electrically connected to the controller 48 is provided in the fuel cell 17 so as to detect the temperature of the fuel cell 17.

The coolant passage 15 circulates through the fuel cell 17, and the temperature of the fuel cell 17 is adjusted as coolant is recirculated through the fuel cell 17. The coolant passage 15 also passes through the water tank 5, and thus the temperature-adjusted coolant adjusts the temperature of the water stored inside the water tank 5.

A humidifying system for humidifying the hydrogen gas and air which are supplied to the fuel cell 17 will now be described using FIG. 3.

The humidifying system comprises the water tank 5, a water passage 11, the injectors 27, 28, and a water pump 8. The water passage 11 is used as a recirculation passage through which water is recirculated. The water pump 8 recirculates water from a water suction outlet 46 of the water tank 5 to a water collection port 56 of the water tank 5 through the water passage 11. Thus the water tank 5, the water passage 11, and the water pump 8 constitute a water recirculation system. The water passage 11 extends from a water suction outlet 46 provided in the lower portion of the water tank 5 to a water collection port 56 provided in the upper portion of the water tank 5. The water passage 11 is provided with a convex pipe 12 between a bifurcated portion 49 and the water tank 5.

The anode humidifying injector 27 is provided with an injector pipe 27*a*, and the cathode humidifying injector 28 is provided with an injector pipe 28*a*. The anode humidifying injector 27 and cathode humidifying injector 28 are connected to the water passage 11 via the injector pipe 27*a* and the injector pipe 28*a* respectively. Thus water is supplied from the water tank 5 to the injectors 27, 28 via the water passage 11.

The part which constitutes the upper portion of the convex pipe 12 is termed as an apex portion 12*a*, the parts forming the two lower ends of the convex pipe 12 are termed as base portions 12*b*, 12*c*, and the parts between the apex portion 12*a* and base portions 12*b*, 12*c* are termed as orthogonal portions 12*d*, 12*e*. A shutoff valve 7 for blocking the water passage, and the water pump 8 which serves as a water recirculating device are disposed on the apex portion 12*a*. The water recirculating device recirculates water inside the humidifying system. The water recirculating device is constituted by the water pump 8 alone, but may be constituted by a plurality of components. For example, the water recirculating device may comprise a water pressure adjustment valve for adjusting the water pressure, a filter for purifying the water, and so on.

A purging air pipe 3 branches off from the apex portion 12*a* between the shutoff valve 7 and the water pump 8 and is connected to the compressor 2 via a purging air supply valve 4. The purging air, which serves as a purge gas, is supplied to the water passage 11 via a supply port 3*a* which is the connecting portion between the purging air pipe 3 and the convex pipe 12. Further, a purging air release pipe 14*a* which branches off from the purging air pipe 3 between the purging air supply valve 4 and the convex pipe 12 is connected to the outside through a purging air release valve 14*b*. Hence a water removing device for supplying purge gas is constituted by the compressor 2, the purging air pipe 3, the supply port 3*a*, and the purging air supply valve 4. A purge gas releasing device for releasing the purge gas is constituted by the purging air release pipe 14*a*, the purging air release valve 14*b*, and a part of the purging air pipe 3.

The bifurcated portion 49 is provided on the end of the downstream base portion 12*c* away from the orthogonal portion 12*e*. A drainage side pipe 49*a* for discharging water outside of the water recirculation system and a supply side pipe 49*b* for supplying water to the injectors 27, 28 branch off from the bifurcated portion 49. In other words, the drainage side pipe 49*a* is connected to the water passage 11 at the bifurcated portion 49. The drainage side pipe 49*a* extends downward, and a drain valve 42 is provided on this pipe.

By opening the drain valve 42, water is discharged outside of the water passage 11.

Water is supplied to the injectors 27, 28 through the supply side pipe 49b. The pressure of the water at this time is adjusted by a water pressure adjustment valve 20 disposed on the downstream side of the injectors 27, 28. Surplus moisture is collected from the upper portion of the water tank 5 through the water passage 11 via the water pressure adjustment valve 20.

The following temperature sensors are provided in order to manage the water in this type of fuel cell system.

First, a water passage temperature sensor 21 for measuring the temperature of the water inside the water passage 11 which is disposed on the water tank-side base portion 12b and a water tank temperature sensor 22 for measuring the temperature of the water inside the water tank 5 are provided. A combustor temperature sensor 23 for measuring the temperature of the combustor 9, a heat exchanger temperature sensor 24 for measuring the temperature of the heat exchanger 10, and a combustion gas temperature sensor 25 for measuring the temperature of the discharged combustion gas which is discharged from the combustor 9 through the heat exchanger 10 are also provided. A purging air release pipe temperature sensor 26 for measuring the temperature of the purging air release pipe 14a is disposed on the purging air release pipe 14a on the downstream side of the purging air release valve 14b. As shown by the dot/dash line in FIG. 1, all of the temperature sensors are electrically connected to the controller 48, and temperature signals are transmitted to the controller 48. The controller 48 performs control of the valves, pumps, and so on in accordance with a temperature signal from one or more of the temperature sensors.

The anode humidifying injector 27, cathode humidifying injector 28, hydrogen control valve 29a, air control valve 30a, pressure adjustment valves 31, 32, hydrogen flow control valve 29b, air flow control valve 30b, anode condensed water recovery valve 35, cathode condensed water recovery valve 36, coolant passage change-over valve 39, an anode condensed drainage valve 40, a cathode condensed drainage valve 41, the purging air supply valve 4, shutoff valve 7, purging air release valve 14b, drain valve 42, water pressure adjustment valve 20, a gas release valve 6, the water pump 8, coolant pump 16, compressor 2, and combustor 9 are electrically connected to the controller 48, as shown by the dot/dash line in FIG. 1, and are operable in accordance with command signals from the controller 48.

Next, a water management method employed during a shutdown of the fuel cell system will be described using the flowchart shown in FIG. 2.

Figure 3:
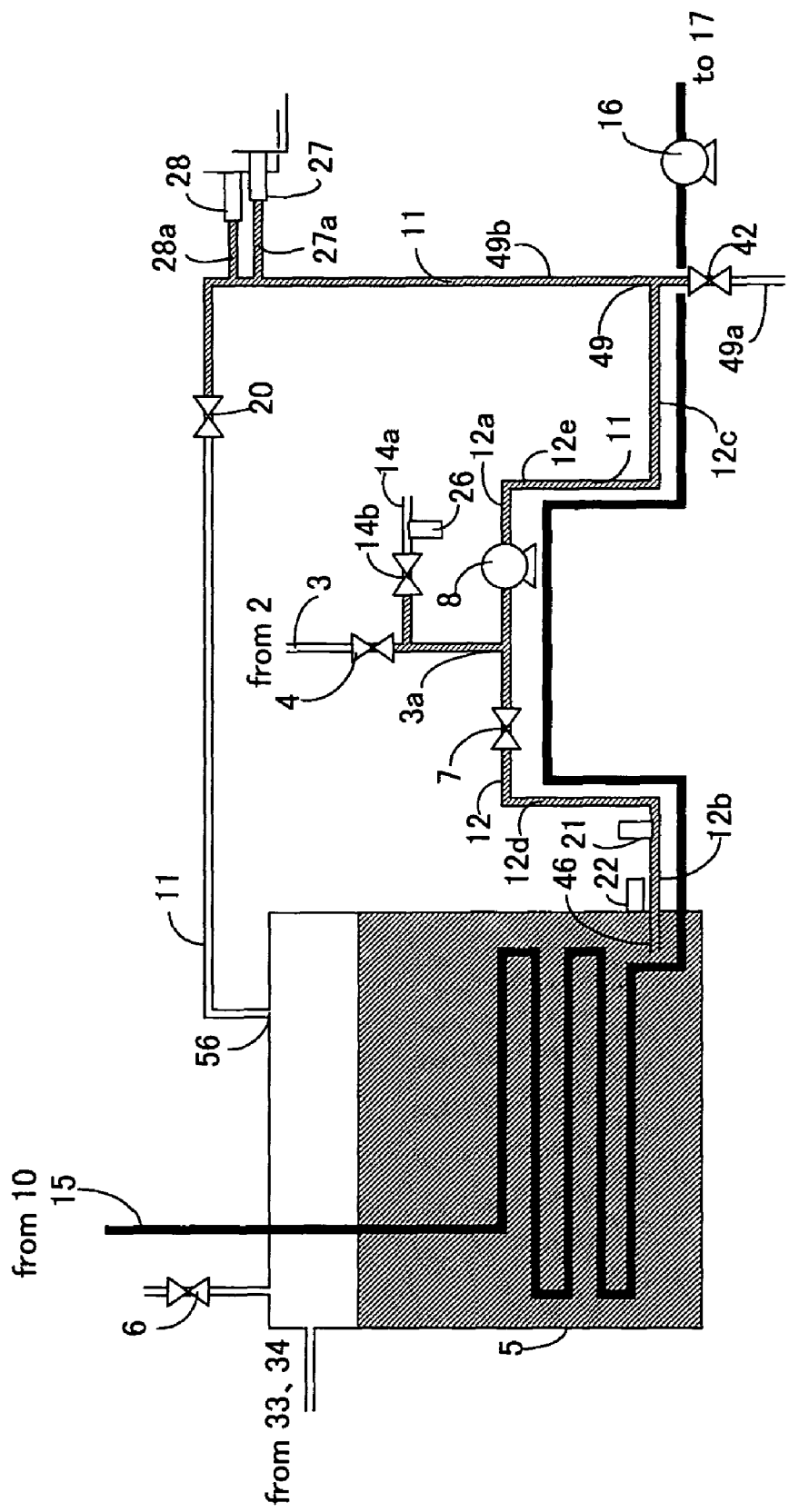
FIG. 3 is an illustrative view showing the distribution of water within the fuel cell system according to the first embodiment immediately after a shutdown operation. The hatched area shows water.

As shown in FIG. 3, the valves 4, 6, 7, 14b, 20, 42 are normally closed at the start of a shutdown operation of the fuel cell system. As a result, water accumulates in the water passage 11 between the water suction port 46 of the water tank 5 and the water pressure adjustment valve 20, in the purging air pipe 3 between the convex pipe 12 and the purging air release valve 4, and in the purging air release pipe 14a between the purging air pipe 3 and the purging air release valve 14b.

Figure 2:
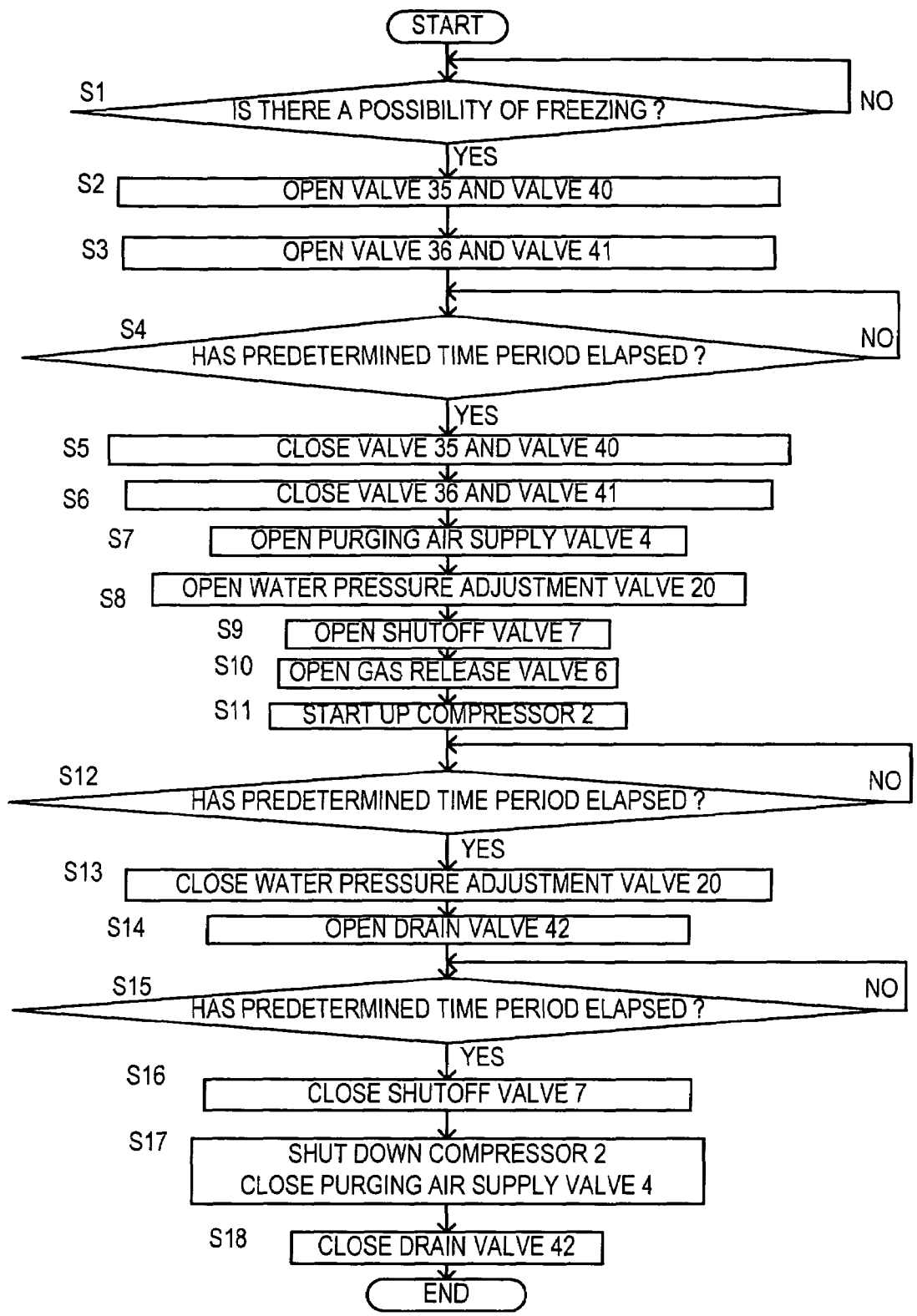
FIG. 2 is a flowchart showing a routine which is executed by a controller immediately after a shutdown of the fuel cell system according to the first embodiment.

Following the start of a shutdown operation of the fuel cell system in this state, the controller 48 performs the following control routine as shown in FIG. 2.

The controller 48 detects that a user has switched a startup/shutdown switch 65 OFF, and upon this detection the control routine shown in FIG. 2 is started by means of interruption processing, for example. The startup/shutdown switch 65 is electrically connected to the controller 48. If the user does not wish to use the fuel cell system for a long period of time, s/he can shut down the fuel cell system by switching the startup/shutdown switch 65 OFF. If the fuel cell system is installed in a vehicle, the startup/ shutdown switch 65 may be a key switch.

The controller 48 is constituted by a microprocessor comprising a central processing unit (CPU), read only memory (ROM) for storing programs and the like, random access memory (RAM) for temporarily storing data and the like obtained as a result of CPU calculations, and an input/output interface. The controller 48 may be constituted by a plurality of microprocessors. The control routine is stored in ROM as a program.

In a step S1, a determination is made as to whether or not there is a possibility of the water inside the humidifying system. This is determined from the temperature of the water accumulated in the water passage 11 which is measured by a freeze detection device disposed in the water passage 11, or in other words the water passage temperature sensor 21. If the measured temperature is larger than a predetermined temperature at which there is a possibility of freezing, for example 0° C., it is determined that the water in the water passage 11 is not frozen, and after the elapse of a predetermined amount of time the routine returns to the step S1. If, on the other hand, the measured temperature is equal to or less than the predetermined temperature, there is a possibility of freezing, and thus the routine advances to a step S2. If a temperature sensor for measuring the outside air temperature is provided, the determination as to whether or not the water in the water passage 11 is frozen may be made using the outside air temperature.

In steps S2 to S4, control is performed to collect the condensed water in the anode passage 43 and cathode passage 44. By means of this control, blockages of the anode passage 43 and cathode passage 44 due to water freezing are prevented.

In the step S2, the anode condensed water recovery valve 35 and the anode condensed drainage valve 40 are opened. In the step S3, the cathode condensed water recovery valve 36 and the cathode condensed drainage valve 41 are opened. In the step S4, a determination is made as to whether or not a first predetermined time period has elapsed following the opening of all of these valves 35, 36, 40, 41. If the first predetermined time period has not elapsed, the routine returns to the step S4 in order to maintain the valves 35, 36, 40, 41 in an open state until the first predetermined time period elapses. Once the first predetermined time period has elapsed, the routine advances to a step S5. In this case, the first predetermined time period in the step S4 is an amount of time required for the condensed water in the passages 43, 44 to be discharged and is determined in advance experientially.

Next, in the step S5, the anode condensed water recovery valve 35 and anode condensed drainage valve 40 are closed. In a step S6, the cathode condensed water recovery valve 36 and cathode condensed drainage valve 41 are closed, thereby completing the control for removing the water inside the anode passage 43 and cathode passage 44.

Figure 4:
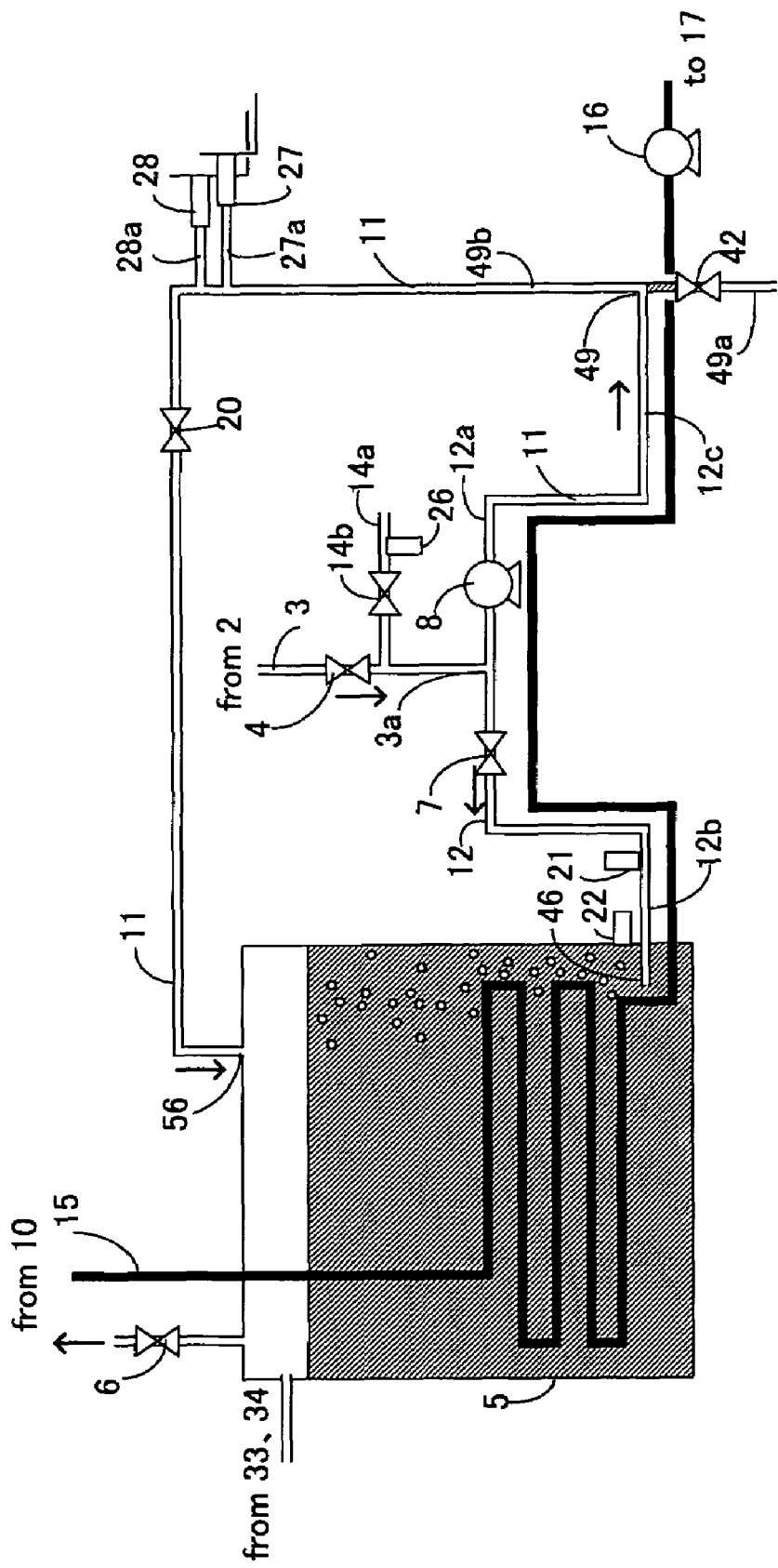
FIG. 4 is a view showing the distribution of water within the fuel cell system according to the first embodiment during water recovery to a water tank.

Next, in steps S7 to S12, control is performed to recover the accumulated water in the water passage 11 as shown in FIG. 4.

In the step S7, the purging air supply valve 4 which is disposed on the purging air pipe 3 is opened. In the step S8, the water pressure adjustment valve 20 which is disposed on the water passage 11 is opened. In the step S9, the shutoff valve 7 for blocking the water passage 11 is opened. In the step S10, the gas release valve 6 for releasing the pressure inside the water tank 5 is opened. The gas release valve 6 is capable of releasing purge gas which has reached the water tank 5 through the water passage 11. Next, in the step S11, the compressor 2 is started up so as to supply purge gas. In the step S12 a determination is made as to whether or not a second predetermined time period has elapsed after the startup of the compressor 2. The compressor 2 is operated with the valves 4, 20, 7 remaining open until the second predetermined time period elapses, and once the second predetermined time period has elapsed, the routine advances to a step S13. In this case the second predetermined time period in the step S12 is the amount of time required for discharging the water in the water passage 11 using air such that the water is collected in the water tank 5, and is determined in advance by experiment or the like.

Thus water is collected by supplying purging air from the compressor 2 to the water passage 11 through the purging air supply valve 4. When the supplied purging air is supplied from the purging air pipe 3 to the convex pipe 12, the purging air separates to the shutoff valve 7 side and the water pump 8 side. The air which is separated to the shutoff valve 7 side is collected in the water tank 5 from the water suction outlet 46 of the water tank 5 while pushing the water inside the convex pipe 12. Meanwhile the air which is separated to the water pump 8 side is collected from the water recovery port 56 in the upper portion of the water tank 5 while pushing the water inside the pipe of the water passage 11 through the water pressure adjustment valve 20. By opening the gas release valve 6 at this time, the interior of the water tank 5 is opened to the outside air, and thus water can be collected in the water tank 5 speedily.

Figure 5:
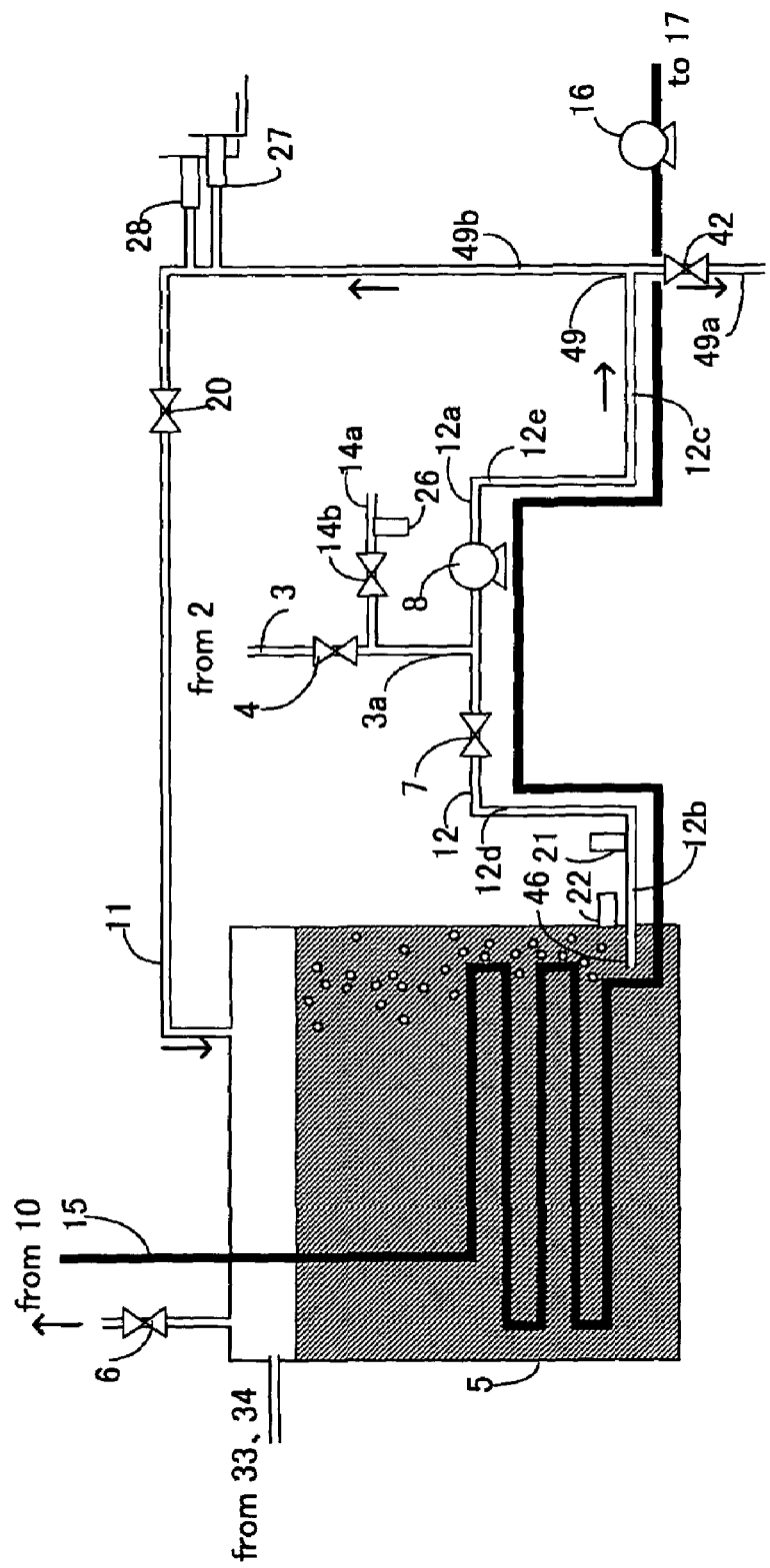
FIG. 5 is a view showing the distribution of water within the fuel cell system according to the first embodiment during water discharge.

Next, in steps S13 to S15, water inside the water passage 11 which could not be collected is discharged as shown in FIG. 5.

In a step S13, the water pressure adjustment valve 20 is closed to block the water passage 11. In a step S14, the drain valve 42 is opened to discharge water from the water passage 11. In a step S15, a determination is made as to whether or not a third predetermined time period has elapsed following the opening of the drain valve 42. The valves 4, 7, 42 are maintained in an open state until the third predetermined time period elapses, and when it is determined that the third predetermined time period has elapsed, the routine advances to a step S16. In this case, the third predetermined time period in the step S15 is the amount of time required for the water inside the water passage 11 to be completely discharged from the drain valve 42, and is determined in advance through experiment or the like.

By thus closing the water pressure adjustment valve 20 and opening the drain valve 42 in the step S13 and S14, the water which still remains between the bifurcated portion 49 and the drain valve 42 or inside the water passage 11 is discharged from the fuel cell system and hence blockages of the water passage 11 due to water freezing are prevented.

Next, in steps S16 to S18, the control for removing water from the water passage 11 is ended.

In a step S16, the shutoff valve 7 for blocking the water passage 11 is closed. At the moment, a predetermined time period which is the sum of the second and third predetermined time periods has elapsed following the start of the supply of purge gas. Next, in a step S17, the compressor 2 is shut down and the purging air supply valve 4 is closed. In a step S18, the drain valve 42 is closed and thus control for preventing freezing ends. After the drain valve 42 is closed, the auxiliary equipment including the pumps, compressor, valves, and so on is powered off.

Figure 6:
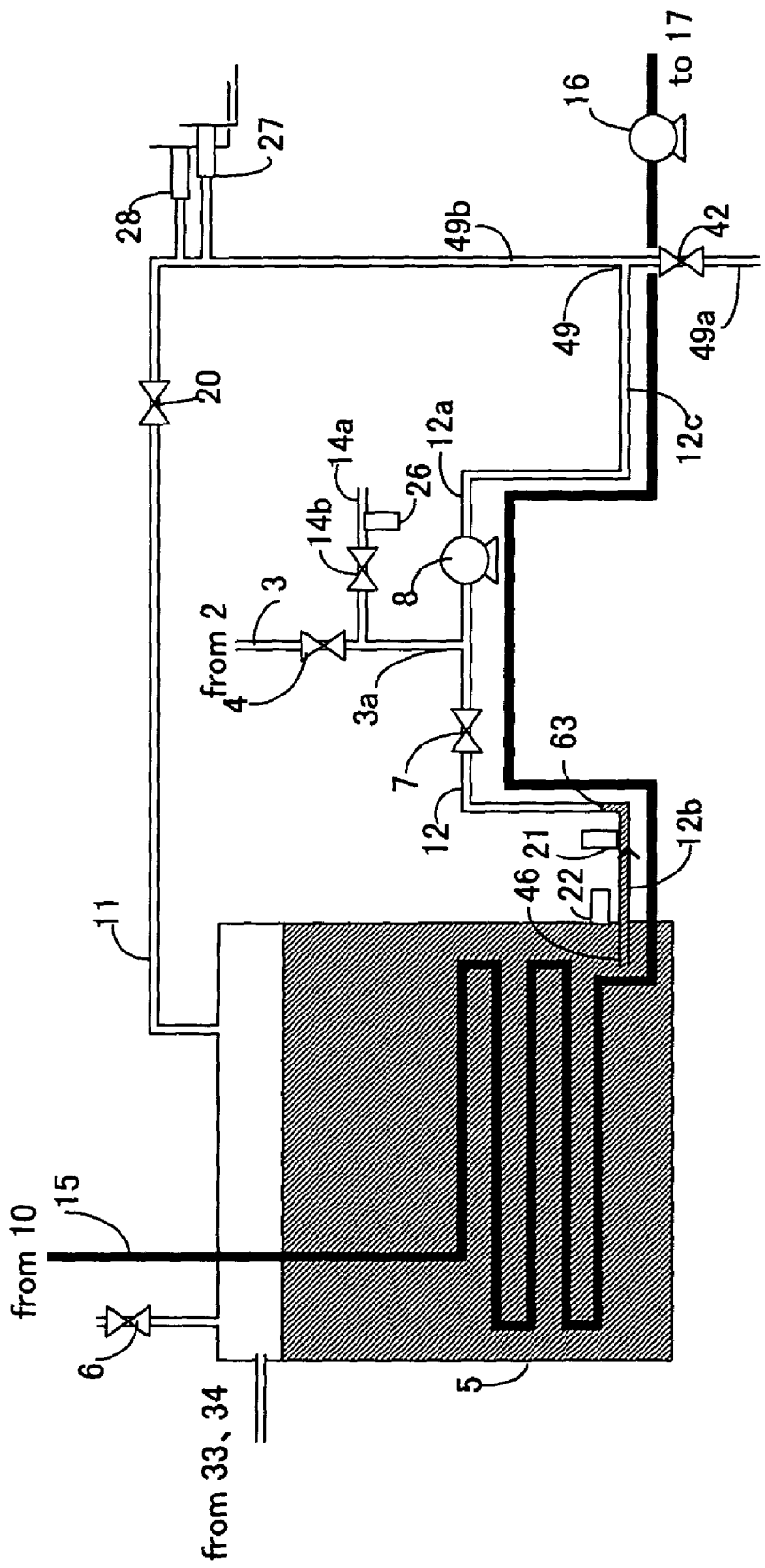
FIG. 6 is a view showing a gas sealed state for preventing freezing in the fuel cell system according to the first embodiment.

The distribution of water at this time is shown in FIG. 6. At the time of closing the shutoff valve 7, the purging air is supplied up to the water suction outlet 46. Hence when the shutoff valve 7 is closed, a layer of purging air is formed between the water suction outlet 46 and the shutoff valve 7. At this time, pressure is applied to the air layer in accordance with the water level inside the water tank 5, as a result of which water inside the water tank 5 returns to the water passage 11 from the water tank 5. However, water only flows into the water passage 11 up to the position at which Ph=Pa, Ph being head pressure which is applied to the water surface 63 in the water passage 11 and which is determined by the difference between the water level of the water tank 5 and the height of the convex pipe 12, and Pa being the pressure of the hermetically sealed, compressed purging air between the water surface 63 and the shutoff valve 7 in the water passage 11. Hence, by setting the form and capacity of the water tank 5 and the height of the convex pipe 12, the water can be halted in a position away from the shutoff valve 7. Thus the freezing of water around the shutoff valve 7 and water pump 8 can be avoided. It is preferable that the water surface 63 of the water which returns to the water passage 11 from the water tank 5 after the shutoff valve 7 blocks the water passage 11 be positioned lower than the apex portion 12a.

Next, a control method employed when the fuel cell system is started up following the freezing prevention processing performed during a shutdown as described above will be described using the flowchart shown in FIG. 7.

Figure 7:
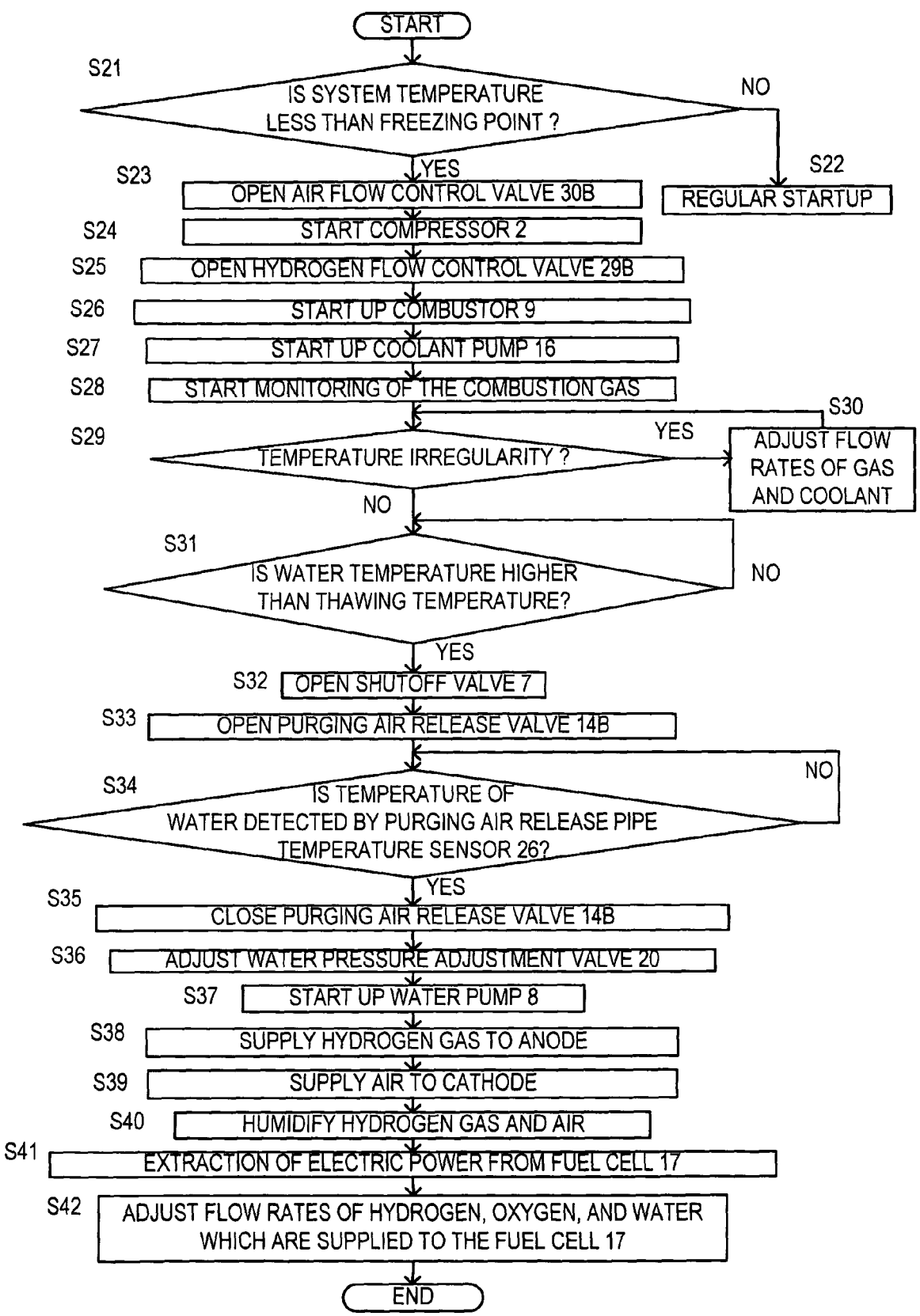
FIG. 7 is a flowchart showing a routine which is executed by a controller when the fuel cell system according to the first embodiment is started up.

The controller 48 detects that the user has switched the startup/shutdown switch 65 ON, and upon this detection the control routine of FIG. 7 is started by means of interruption processing, for example.

In a step S21, a determination is made as to whether or not the temperature of the fuel cell system is less than a second predetermined temperature which is, for example, freezing point 0° C. If the temperature of the fuel cell system is larger than the second predetermined temperature, it is determined that the water is not frozen and the routine advances to a step S22 to perform startup of the fuel cell system according to a regular startup procedure. If, on the other hand, the temperature of the fuel cell system is equal to or less than the second predetermined temperature, the routine advances to a step S23. Also in the step S23, the auxiliary equipment including the valves, compressor, pumps and so on is powered on.

In a step S23, the air flow control valve 30b is opened, and in a step S24 the compressor 2 is operated such that the supply of air to the combustor 9 is begun. In a step S25, the hydrogen flow control valve 29b is opened such that the supply of hydrogen to the combustor 9 is begun.

Next, in a step S26, combustion is begun in the combustor 9 using the supplied air and hydrogen. At this time air and hydrogen are supplied to the combustor 9 in a mixing ratio at which the combustion temperature is equal to or less than the heat resistance temperature of the combustor 9 and heat exchanger 10. Below the heat resistance temperature the combustor 9 and heat exchanger 10 can operate without damage or trouble. Then, in a step S27, the coolant pump 16 which serves as a power source for recirculating the coolant through the coolant system is operated. As a result, the coolant which flows through heat exchanger 10 and is used to cool the fuel cell 17 are heated by combustion gas produced in the combustor 9.

Figure 8:
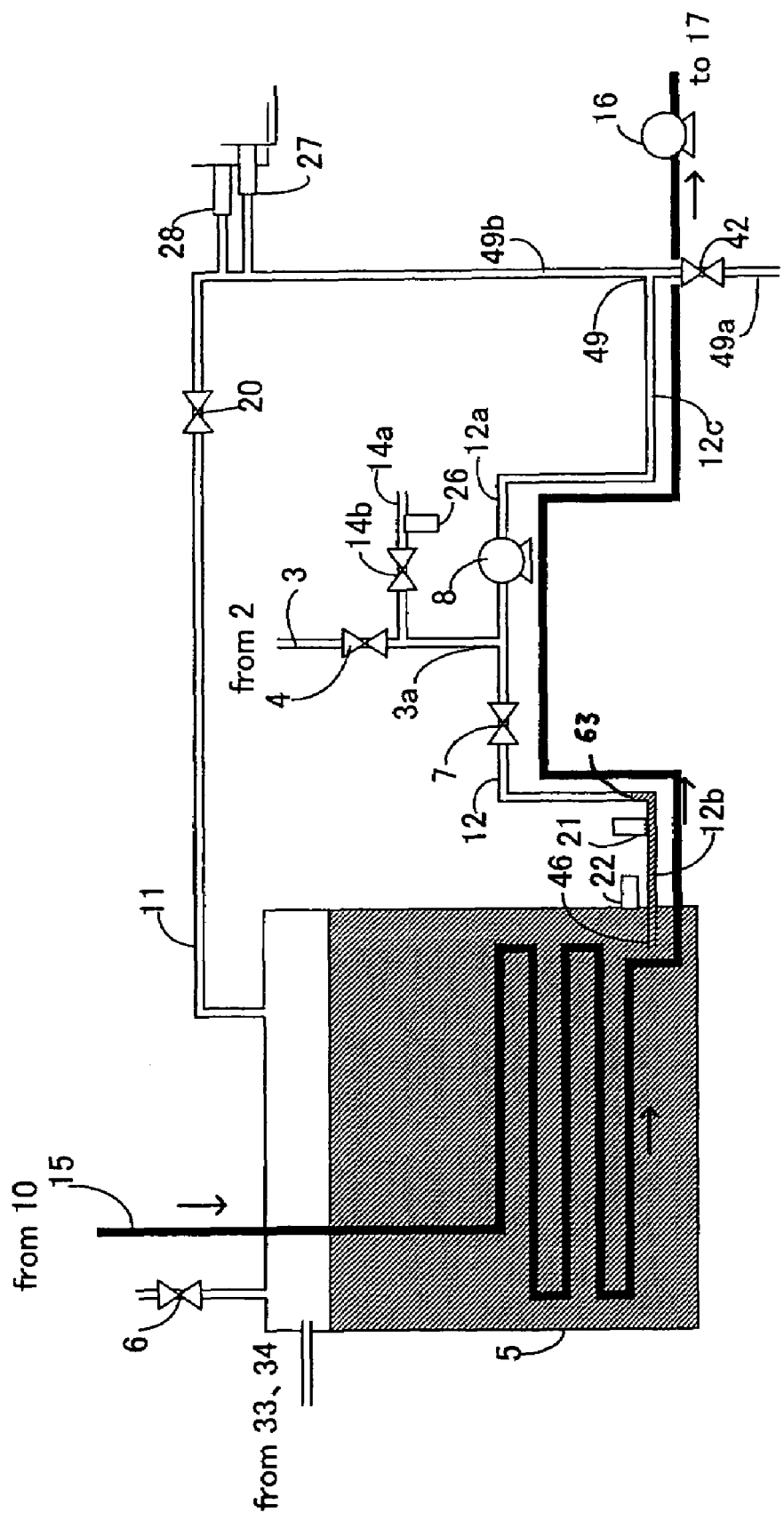
FIG. 8 is an illustrative view showing the flow of heated coolant during the recirculation of heated coolant through the fuel cell system according to the first embodiment.

FIG. 8 shows how the humidifying system is warmed by heated coolant. The heated coolant passes through the coolant passage 15 to heat the water tank 5 and the fuel cell 17 in turn. Here, the part of the water passage 11 into which water has returned from the water suction outlet 46 and the coolant passage 15 are disposed at a sufficiently short distance for heat transfer to take place and substantially parallel to one another. In so doing, the frozen water (ice) accumulated in the water passage 11 by the pressure inside the water tank 5 may be defrosted by the heated coolant. In FIG. 8, the water passage 11 and coolant passage 15 are disposed side by side from the vicinity of the water suction outlet 46 to the bifurcated point 49.

Once the defrosting of the water in the fuel cell 17, water tank 5, and the water in the vicinity of water suction outlet 46 has begun in this manner, the routine advances to a step S28, where monitoring of the combustion gas temperature is begun. Here, the temperature is measured by the combustor temperature sensor 23, the heat exchanger temperature sensor 24, and the combustion gas temperature sensor 25. In a step S29, a determination is made as to whether any temperature irregularities such as an excessive rise in the combustion gas temperature, the combustor temperature, or the heat exchanger temperature exist. If a temperature irregularity exists, the routine advances to a step S30 where the flow rates of the gas supplied to the combustor 9 and the coolant are adjusted. Flow rate adjustment is performed in the steps S29 and S30 until it is determined that the warm-up operation is normal without the temperature irregularities, and when it is determined that the warm-up operation is normal, the routine advances to a step S31.

In the step S31, a determination is made in accordance with the measured temperatures of the water passage temperature sensor 21 and water tank temperature sensor 22 as to whether or not the water in the water passage 11 and water tank 5 is frozen. Here, a determination is made as to whether or not the temperature of the water in the water passage 11 and water tank 5 is higher than thawing temperature about 0° C. The warm-up operation is continued until the water in the water passage 11 and water tank 5 defrosts. When it is determined that the water in the water passage 11 and water tank 5 has defrosted, the routine advances to a step S32.

Figure 9:
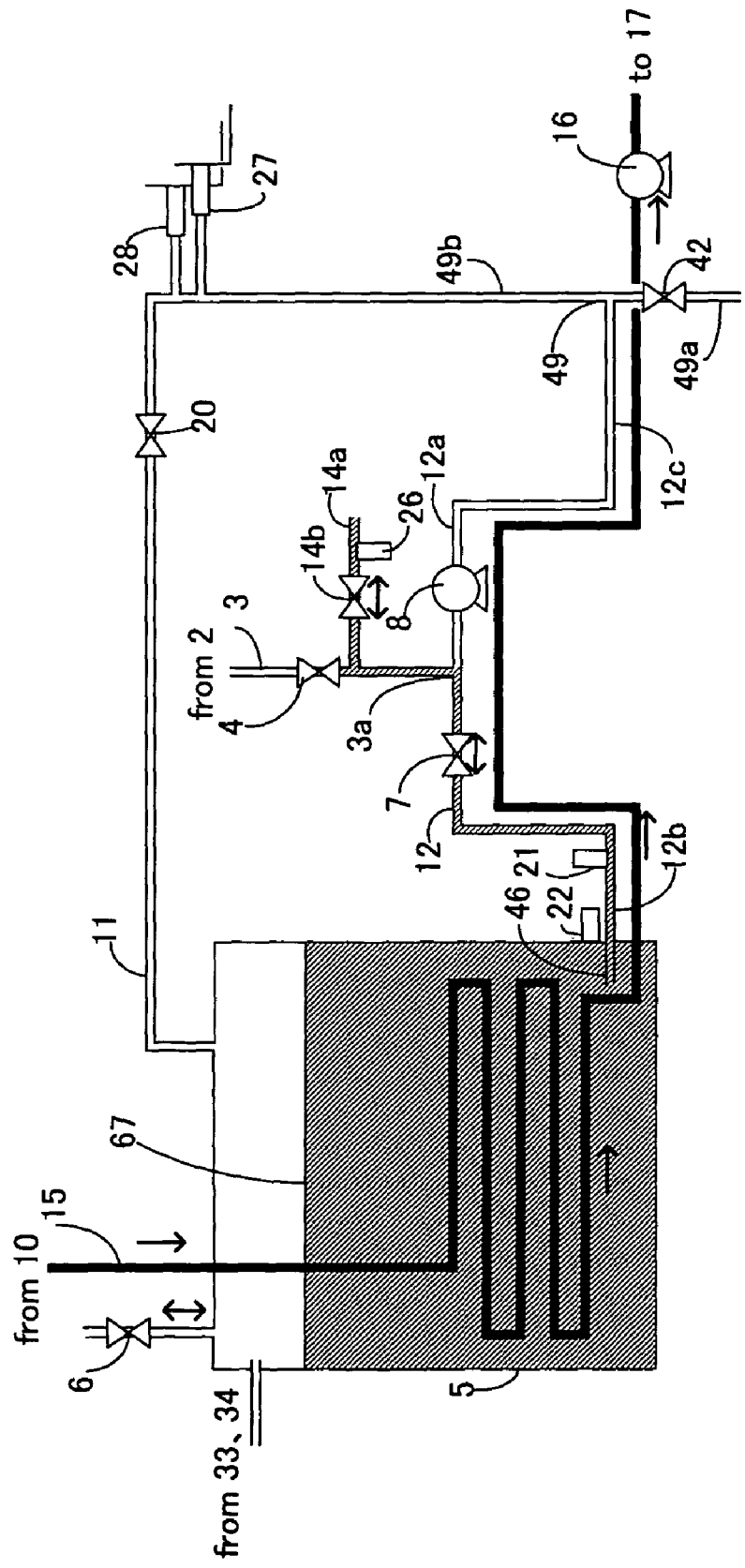
FIG. 9 is a view showing the distribution of water within the fuel cell system according to the first embodiment during the discharge of purging air.

From the step S32, control such as that shown in FIG. 9 is performed to discharge the purging air. In the step S32, the shutoff valve 7 is opened. In a step S33, the purging air release valve 14b is opened. The purging air release valve 14b is located in a lower position than a current water level 67 even after the opening of the shutoff valve 7 and the purging air release valve 14b. In so doing, the purging air retained in the purging air pipe 3 and purging air release pipe 14a can be pushed out from the purging air release valve 14b by water. The current water level 67 in the water tank 5 is reduced from the level of the water accumulated before the shutoff valve 7 and the purging air release valve 14b are opened substantially by the volume of water in the water passage 11 between the water suction outlet 46 and the purging air release valve 14b.

In a step S34, a determination is made as to whether or not the temperature measured by the purging air release pipe temperature sensor 26 is substantially equal to the temperature measured by the water passage temperature sensor 21. In other words, a determination is made as to whether or not the temperature of the water in the water passage 11 has been detected by the purging air release pipe temperature sensor 26. If there is a difference between the temperature measured by the purging air release pipe temperature sensor 26 and the temperature measured by the water passage temperature sensor 21, then the purging air has not been completely discharged, and hence the purging air discharge operation is continued. If, in the step S34, there is substantially no difference between the two measured temperatures, it is determined that purging air discharge is complete after water has reached to the purging air release pipe temperature sensor 26 and the routine advances to a step S35.

Next, control is performed to shift from a warm-up operation of the fuel cell to a normal operation thereof.

Figure 10:
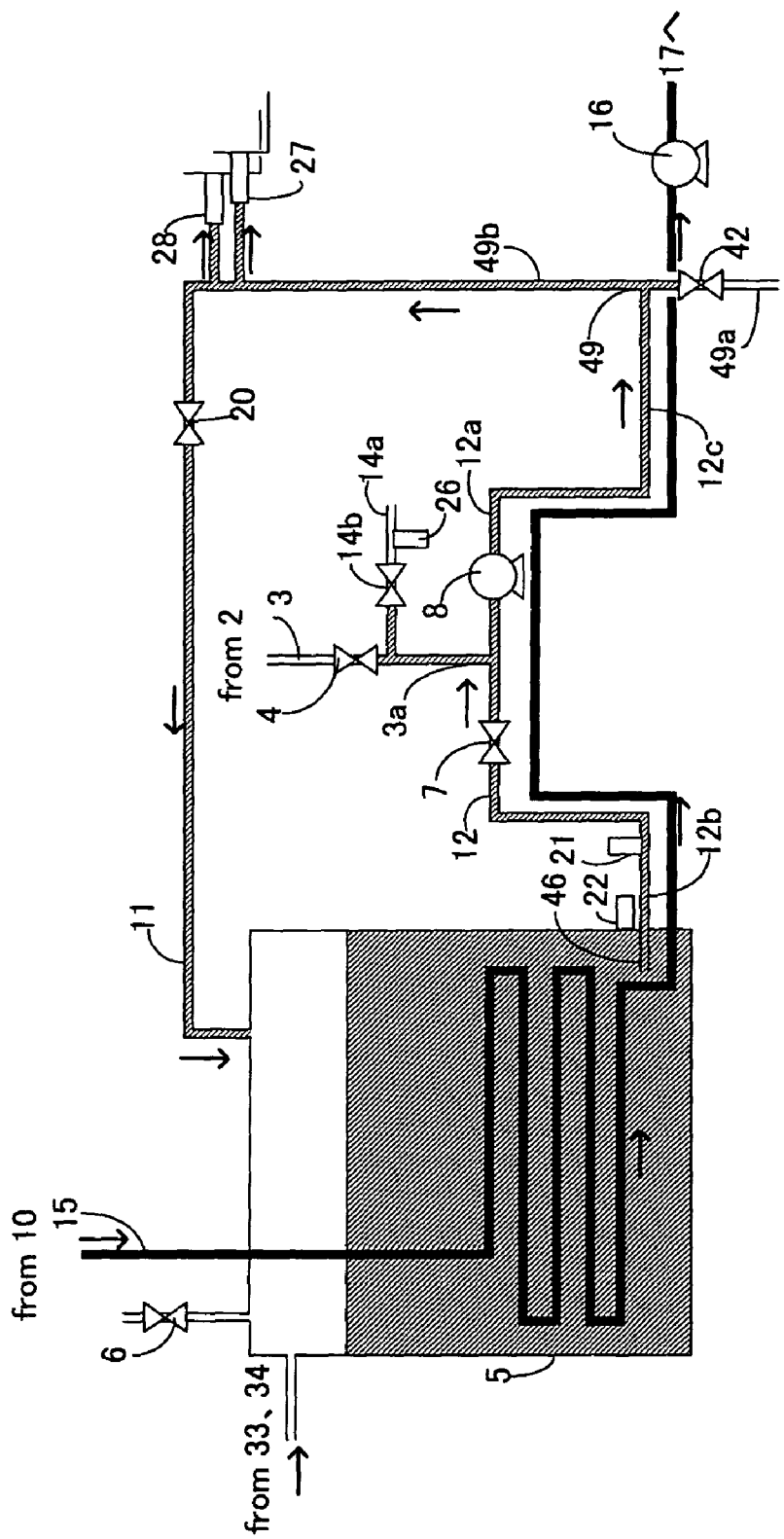
FIG. 10 is an illustrative view showing the flow of water through the fuel cell system according to the first embodiment during water recirculation in the water recirculation system.

In the step S35, the purging air release valve 14b is closed. In a step S36 the opening of the water pressure adjustment valve 20 is adjusted such that the water passage 11 is opened. In a step S37, the water pump 8 is operated and the water in the water tank 5 begins to be recirculated through the water passage 11. Hence, as shown in FIG. 10, the water accumulated in the water tank 5 is supplied to the injectors 27, 28.

In a step S38, the hydrogen flow control valve 29b is closed and the hydrogen control valve 29a is opened, and as a result hydrogen gas is supplied to the anode 17a of the fuel cell 17. In a step S39, the air flow control valve 30b is closed and the air control valve 30a is opened, whereby air is supplied to the cathode 17b of the fuel cell 17. In a step S40, humidifying of the hydrogen gas and air which are supplied to the fuel cell 17 from the injectors 27, 28 is begun. Thereby, electric power generation in the fuel cell 17 is begun, and thus in a step S41 electric power is extracted from the fuel cell 17. In a step S42, the flow rates of the hydrogen, oxygen, and water which are supplied to the fuel cell 17 are adjusted in accordance with this electric power. Henceforth the startup operation ends and a normal operation begins.

The effects of constituting and controlling the fuel cell system in the manner described above are as follows.

The fuel cell system comprises the purging air supply valve 4 for supplying purging air to the water passage 11, the water pump 8 which serves as a water recirculating device, and the shutoff valve 7 for preventing water from flowing at least into the water pump 8 in the water passage 11. When the fuel cell system is shut down, purging air is supplied in a wider range than the range of blockage by the shutoff valve 7, whereupon the water passage 11 is blocked by the shutoff valve 7. As a result, an air layer is formed between the water and the shutoff valve 7 such that water can be prevented from freezing around the water pump 8 and shutoff valve 7. Thus a deterioration in the performance of the water pump 8 serving as a water recirculating device and the shutoff valve 7 caused by freezing can be prevented.

In particular, a sealing device comprising the shutoff valve 7, pressure adjustment valve 20, drain valve 42, purging air release valve 14b, and purging air supply valve 4 hermetically seals the purging air inside the water passage 11. Thus the fuel cell system comprises a sealing device for switching between a hermetically sealed state in a range including at least the water recirculating device (water pump 8) and a non-hermetically sealed state of the water passage 11, and therefore performance deterioration due to freezing of the water recirculating device can be prevented. Deterioration in the performance of the sealing device valve (in this embodiment the shutoff valve 7) due to freezing is also suppressed by forming an air layer between the sealing device valve and the water purged towards the water tank 5.

The fuel cell system further comprises a freeze detection device, in this case the water passage temperature sensor 21, for detecting the possibility of water freezing, and purging air is supplied into the water passage 11 only when the controller 48 determines the possibility of water freezing. Hence power and water consumption can be reduced.

Further, as long as the water suction outlet 46 for introducing water into the water passage 11 from the water tank 5 is formed in the lower portion of the water tank 5 and the water pump 8 is disposed above the water suction outlet 46, the air layer can be formed reliably between the shutoff valve 7 and the water.

Also, since the water pump 8 is disposed on the apex portion 12a of the convex pipe 12 and the water suction outlet 46 is formed at one end of the base portion 12b, at least the apex portion 12a is set as the range in which water influx is blocked by the shutoff valve 7. As a result, the air layer can be formed reliably between the shutoff valve 7 and the water such that deterioration of the shutoff valve 7 due to freezing can be reliably prevented.

By connecting the purging air pipe 3 to the apex portion 12a, purging air is supplied from the upper apex portion 12a to the lower base portion 12b. Hence water removal can be performed efficiently.

During startup of the fuel cell system, a determination is made as to whether or not the temperature in the vicinity of the purging air release valve 14b and the water temperature in the base portion 12b on the water tank 5 side are substantially equal. In so doing, the completion of purging air discharge can be easily determined.

The fuel cell system also comprises the combustor 9 and heat exchanger 10 for heating the coolant inside the coolant passage 15, and at least a part of the water passage 11 and a part of the coolant passage 15 are disposed side by side. Thus during a startup when the water inside the system is frozen, at least a part of the water passage 11 can be warmed. As a result, the water flowing through the water passage 11 can be prevented from refreezing during the startup. In particular, since the part of the water passage 11 into which water has returned from the water tank 5 after the shutoff valve 7 is closed and the coolant passage 15 are disposed side by side, the water which flows into the water passage 11 can be easily defrosted.

Further, by disposing a part of the coolant passage 15 inside the water tank 5 and adjusting the coolant temperature during startup of the fuel cell system, the frozen water inside the water tank 5 can be defrosted.

A part of the water passage 11 is constituted by the convex pipe 12, the water pump 8 which serves as a water recirculating device is disposed on the apex portion 12a of the convex pipe 12, and the supply port 3a for supplying purging air to the water passage 11 is formed on the apex portion 12a. As a result, the water in the part in which the water recirculating device is disposed can be effectively removed.

Figure 11:
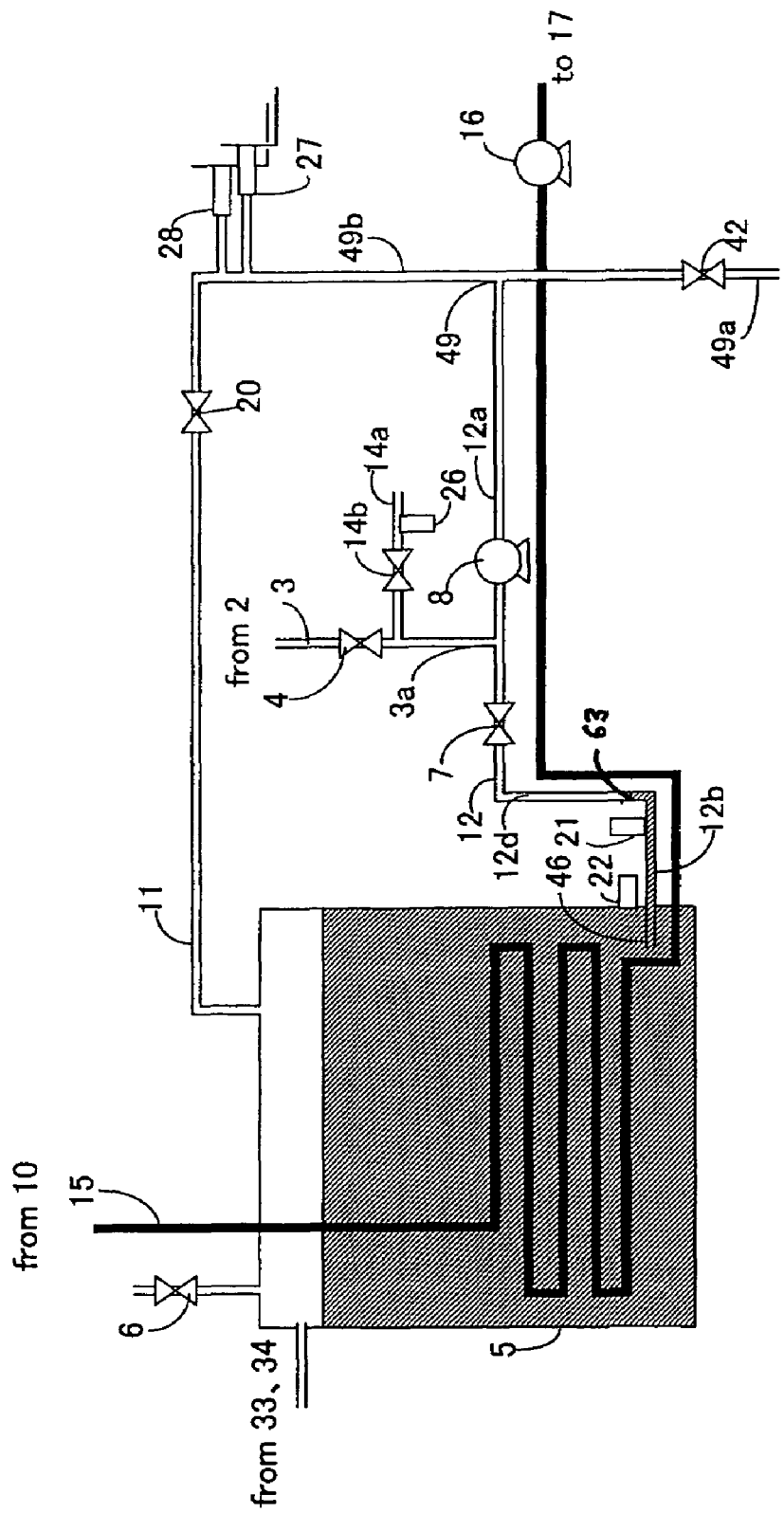
FIG. 11 is an illustrative view showing a fuel cell system according to a second embodiment and a gas sealed state for preventing freezing within the fuel cell system.

Referring now to FIG. 11, a second embodiment will be described. FIG. 11 shows the configuration of a fuel cell system according to the second embodiment. FIG. 11 illustrates a gas sealed state in which the water inside the water passage 11 is discharged when a possibility of freezing exists after a shutdown of the fuel cell system.

The second embodiment differs from the first embodiment in that the base portion 12c and orthogonal portion 12e of the water passage 11, which are positioned between the water pump 8 and the bifurcated portion 49 in FIG. 3, have been removed such that the apex portion 12a extends along the opposite side to the water tank 5 and is connected to the bifurcated portion 49. Otherwise the constitution is identical to that of the first embodiment.

The water passage 11 is set in a piping layout having a rising gradient from the water suction outlet 46 to the bifurcated portion 49. Hence the water suction outlet 46 is positioned at the lowest point and the shutoff valve 7, water pump 8, and bifurcation point 49 are positioned in a higher location than the water suction outlet 46. Here, the shutoff valve 7, water pump 8, and bifurcation point 49 are formed substantially at the same height.

Thus the constitution of the water passage 11 is simpler than in the first embodiment, and as a result water pressure loss can be reduced and power consumption by the water pump 8 can be reduced.

Figure 12:
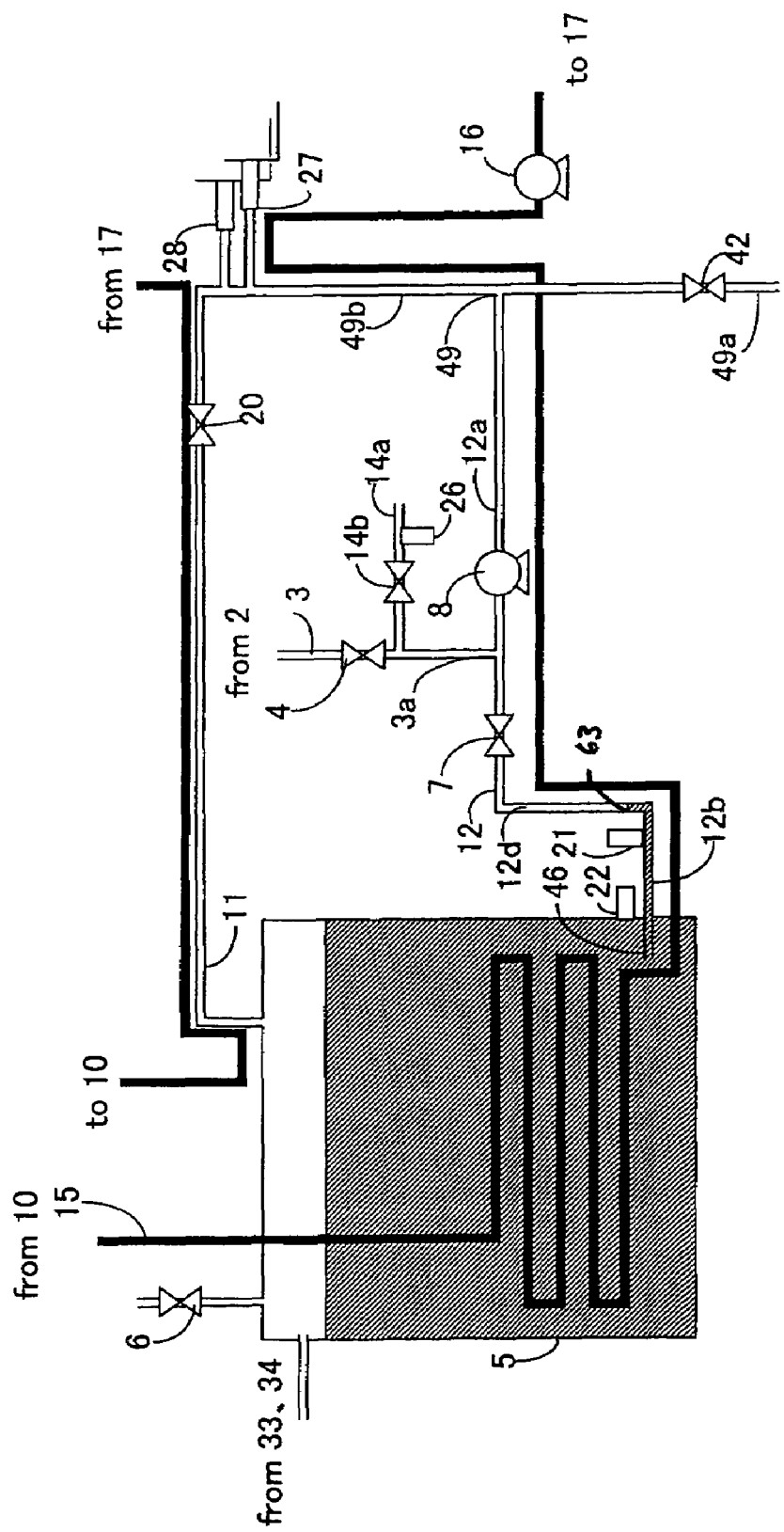
FIG. 12 is an illustrative view showing a fuel cell system according to a third embodiment and a gas sealed state for preventing freezing within the fuel cell system.

Referring now to FIG. 12, a third embodiment will be described. FIG. 12 shows the configuration of a fuel cell system used in the third embodiment. FIG. 12 illustrates a gas sealed state in which the water inside the water passage 11 is discharged when a possibility of freezing exists after a shutdown of the fuel cell system.

In this embodiment, the coolant passage 15 is disposed alongside the water passage 11 over a longer distance than in the second embodiment. First, the coolant passage 15 is disposed alongside the water passage 11 from the water suction outlet 49 to the injectors 27, 28. Then the coolant passage 15 extending from the fuel cell 17 is disposed alongside the water passage 11 extending from the injectors 27, 28 to the water tank 5. The coolant passage 15 which is disposed alongside the water passage 11 up to the vicinity of the water tank 5 is connected to the heat exchanger 10, and thus during a startup of the fuel cell system the heat exchanger 10 heats the coolant flowing through the coolant passage 15. Further, the coolant passage 15 which extends from the heat exchanger 10 passes through the interior of the water tank 5 such that the water inside the water tank 5 is warmed by the heated coolant.

By disposing the coolant passage 15 alongside the substantially entire water passage 11 in this manner, the water passage 11 is warmed by the coolant which is heated in the heat exchanger 10. Accordingly, the temperature of the water passage 11 can be raised even when the temperature of the water passage 11 has fallen after a shutdown of the fuel cell system, and the refreezing of the water which has flowed back into the water passage 11 from the water tank 5 after the shutoff valve 7 is closed can be reliably suppressed.

Figure 13:
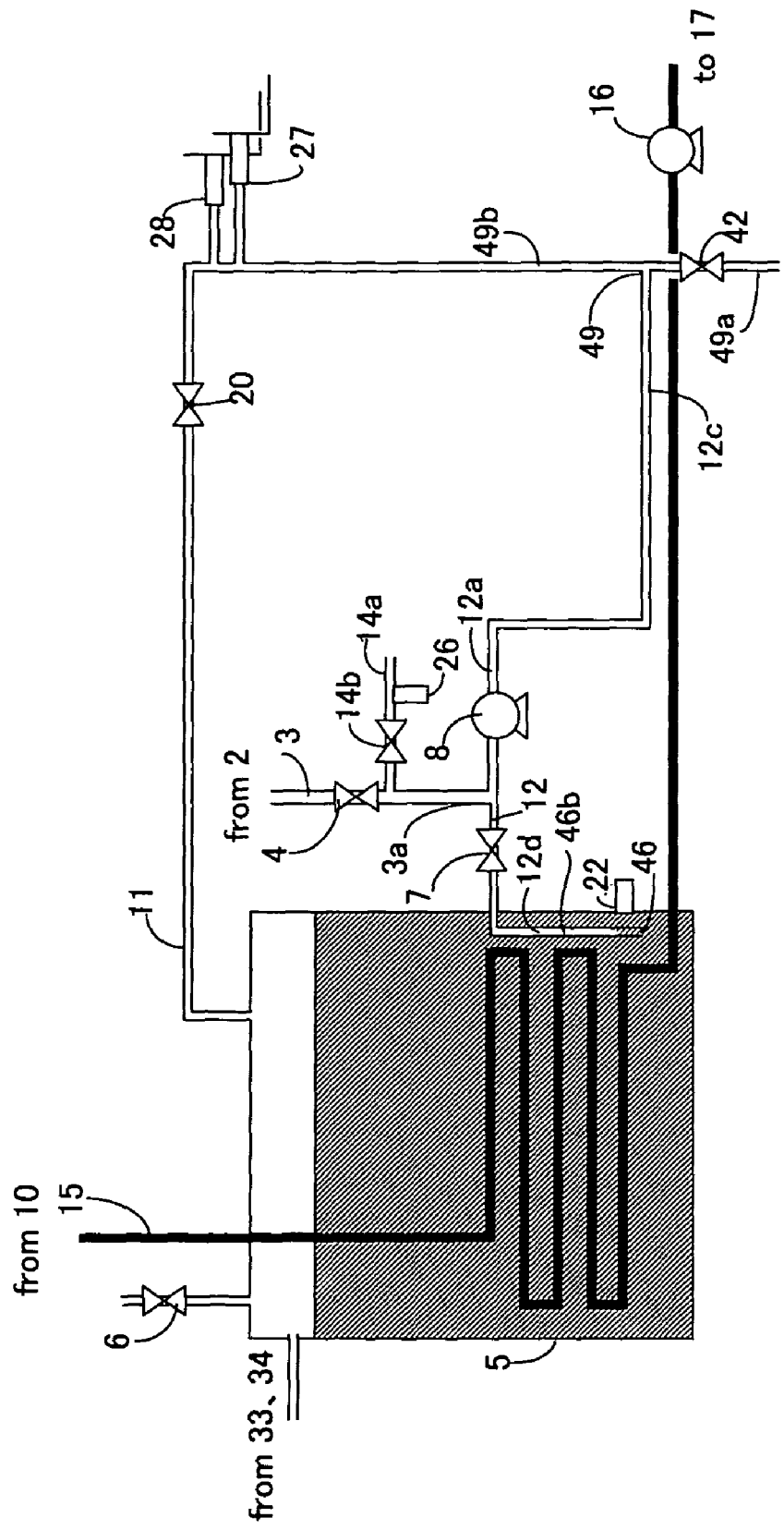
FIG. 13 is an illustrative view showing a fuel cell system according to a fourth embodiment and a gas sealed state for preventing freezing within the fuel cell system.

Referring now to FIG. 13, a fourth embodiment will be described. FIG. 13 shows the configuration of a fuel cell system used in the fourth embodiment. FIG. 13 illustrates a gas sealed state in which the water inside the water passage 11 is discharged when a possibility of freezing exists after a shutdown of the fuel cell system.

The fourth embodiment differs from the first embodiment in that the base portion 12b of the water passage 11 positioned between the water tank 5 and the shutoff valve 7 in FIG. 3 has been removed, and the upstream side orthogonal portion 12d is formed in the interior of the water tank 5. The upstream side orthogonal portion 12d of the water passage 11 is constituted by a pipe 46b which extends upward within the water tank 5 from the water suction outlet 46. The shutoff valve 7 and water pump 8 are disposed on the apex portion 12a. Here, the outlet part of the water passage 11 from the water tank 5, the shutoff valve 7, and the water pump 8 are disposed substantially at the same height.

A temperature measured by the water tank temperature sensor 22 is used at this time in the flowcharts in FIGS. 2 and 7 in place of a temperature measured by the water passage temperature sensor 21.

In this manner, the water suction outlet 46 is formed in the interior of the water tank 5 and a part of the water passage 11 is constituted by the pipe 46b which extends upward from the water suction outlet 46 inside the water tank 5. Hence the constitution of the water passage 11 can be simplified. As a result, water pressure loss can be reduced and power consumption by the water pump 8 can be reduced.

The entire contents of Japanese Patent Application P2002-197116 (filed Jul. 5, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A fuel cell system having a fuel cell for generating electric power using fuel gas and oxygen-bearing gas, comprising:
   a humidifying device for humidifying at least one of the fuel gas and oxygen-bearing gas which are supplied to the fuel cell;
   a water tank for storing water used in the humidifying performed by the humidifying device;
   a water passage through which water from the water tank flows to the humidifying device; wherein the water passage is provided with a base portion, an apex portion which is positioned higher than the base portion, and an orthogonal portion which is higher than the base portion and connects the base portion and the apex portion;
   a water removing device for supplying purge gas to the water passage so as to remove the water in the water passage; the water removing device comprising a supply port which is supplied with purge gas and is disposed on the apex portion;
   a water recirculating device for enabling the passage of water through the water passage, the water recirculating device being disposed on the water passage;
   a shutoff valve for blocking the water passage such that water from the water tank does not flow into the water recirculating device, the shutoff valve being provided between the water tank and the water recirculating device;
   a water suction outlet for introducing water from the water tank into the water passage, wherein the water suction outlet is connected to the base portion of the water passage, the base portion being positioned at the substantially same level as the water suction outlet; the shutoff valve being disposed in a higher position than the water suction outlet;
   a purge gas releasing device for releasing purge gas from the water passage, the purge gas releasing device connecting to the apex portion of the water passage and comprising a release pipe through which purge gas flows and a gas release valve positioned on the release pipe;
   a water passage temperature sensor for measuring a temperature of the water in the water passage further toward the water tank side than the shutoff valve;
   a purge gas release pipe temperature sensor disposed in the vicinity of the purge gas release valve; and
   a controller which is electrically connected to the water removing device, water recirculating device, shutoff valve, the purge gas releasing device, the water passage temperature sensor and the purge gas release pipe temperature sensor, so as to control shutdown and startup operations of the fuel cell system, the controller functioning to:
   control the shutoff valve to open and control the water removing device to start a supply of purge gas to the water passage when a shutdown operation of the fuel cell system begins;
   control the shutoff valve to block the water passage after a predetermined time period has elapsed following the start of the supply of purge gas and control the water removing device to halt the supply of purge gas after the water passage has been blocked by the shutoff valve; whereby purge gas is sealed between the shutoff valve and the water surface of the water which returns to the water passage from the water tank after the shutoff valve has blocked the water passage;
   control the purge gas releasing device to release purge gas from the water passage when a startup operation of the fuel cell system begins;
   compare a temperature detected by the purge gas pipe temperature sensor with a temperature detected by the water passage temperature sensor; and
   stop the release of purge gas by the purge gas releasing device when it is determined that the temperature detected by the purge gas pipe temperature sensor and the temperature detected by the water passage temperature sensor are substantially equal.

2. The fuel cell system as defined in claim 1, further comprising a sensor for detecting a temperature of the water inside the fuel cell system, wherein the controller further functions to:
   compare the water temperature and a predetermined temperature; and
   only when the water temperature exceeds the predetermined temperature, to control the water removing device to supply purge gas to the water passage.

3. The fuel cell system as defined in claim 1, wherein the water recirculating device is disposed in a higher position than the water suction outlet.

4. The fuel cell system as defined in claim 3, wherein the water recirculating device is disposed on the apex portion.

5. The fuel cell system as defined in claim 4, wherein the water passage comprises a water passage pipe on which the humidifying device is disposed and a bifurcated portion between the water passage pipe which extends upward and a drainage side pipe which extends downward from the bifurcated portion, the bifurcated portion being positioned at one end of the apex portion on the opposite side to the water tank, and a drain valve for draining the water inside the water passage being disposed on the drainage side pipe.

6. The fuel cell system as defined in claim 4, wherein the water passage is further provided with a second base portion which is positioned lower than the apex portion, and a part which connects the second base portion and the apex portion, and wherein the water passage comprises:
   a water passage pipe on which the humidifying device is disposed and a bifurcated portion between the water passage pipe which extends upward and a drainage side pipe which extends downward from the bifurcated portion, the bifurcated portion being positioned at one end of the second base portion, and a drain valve for draining the water inside the water passage being disposed on the drainage side pipe.

7. The fuel cell system as defined in claim 3, wherein the water suction outlet is formed in the interior of the water tank, and
   the water passage is provided with a pipe which extends upward inside the water tank from the water suction outlet.

8. The fuel cell system as defined in claim 1, further comprising:
   a coolant passage through which coolant for adjusting a temperature of the fuel cell flows;
   a combustor for burning fuel containing hydrogen atoms to produce high temperature combustion gas; and
   a heat exchanger for heating the coolant using the combustion gas produced by the combustor,
   wherein at least a part of the water passage and a part of the coolant passage are disposed substantially in parallel such that heat is transferred from the coolant passage to the water passage.

9. The fuel cell system as defined in claim 8, wherein a part of the coolant passage is disposed inside the water tank in order to adjust a temperature of the water inside the water tank.

10. The fuel cell system as defined in claim 1, wherein the water recirculating device is disposed between the shutoff valve and the humidifying device.

11. The fuel cell system as defined in claim 1, wherein the water passage extends from a water suction outlet provided in the lower portion of the water tank to a water collection port which is provided in the upper portion of the water tank, and
the water tank comprises a gas release valve which is capable of releasing the purge gas which has reached the water tank through the water passage.

12. The fuel cell system as defined in claim 1, wherein, before the water passage is blocked by the shutoff valve, the water removing device supplies purge gas in a wider range than a blockage range of the shutoff valve, whereupon the water passage is blocked by the shutoff valve.

13. The fuel cell system as defined in claim 1, further comprising a water pressure adjustment valve, wherein the water pressure adjustment valve and the shutoff valve are closed to hermetically seal the purge gas supplied into the water passage.

14. The fuel cell system as defined in claim 1, wherein the predetermined time period is a time period required for expelling water from the water passage by the supply of purge gas.

15. A control method for controlling a fuel cell system having a fuel cell for generating electric power using fuel gas and oxygen-bearing gas; a humidifying device for humidifying at least one of the fuel gas and oxygen-bearing gas which are supplied to the fuel cell; a water tank for storing water used in the humidifying performed by the humidifying device; a water passage through which water from the water tank flows to the humidifying device; a water removing device for supplying purge gas to the water passage so as to remove the water in the water passage; a water recirculating device for enabling the passage of water through the water passage; and a shutoff valve for blocking the water passage such that water from the water tank does not flow into the water recirculating device, the water recirculating device being disposed on the water passage, the shutoff valve being provided between the water tank and the water recirculating device; a purge gas releasing device for releasing purge gas from the water passage, the purge gas releasing device connecting to the apex portion of the water passage and comprising a release pipe through which purge gas flows and a gas release valve positioned on the release pipe; a water passage temperature sensor for measuring a temperature of the water in the water passage further toward the water tank side than the shutoff valve; a purge gas release pipe temperature sensor disposed in the vicinity of the purge gas release valve;
the control method comprising:
controlling the shutoff valve to open when a shutdown operation of the fuel cell system begins;
controlling the water removing device to start a supply of purge gas to the water passage when the shutdown operation of the fuel cell system begins;
controlling the shutoff valve to block the water passage after a predetermined time period has elapsed following the start of the supply of purge gas;
controlling the water removing device to halt the supply of purge gas after the water passage has been blocked by the shutoff valve;
comparing a temperature detected by the purge gas pipe temperature sensor with a temperature detected by the water passage temperature sensor; and
stopping the release of purge gas by the purge gas releasing device when it is determined that the temperature detected by the purge gas pipe temperature sensor and the temperature detected by the water passage temperature sensor are substantially equal.

16. A fuel cell system having a fuel cell for generating electric power using fuel gas and oxygen-bearing gas, comprising:
humidifying means for humidifying at least one of the fuel gas and oxygen-bearing gas which are supplied to the fuel cell;
water storing means for storing water used in the humidifying performed by the humidifying means;
a water passage through which water from the water storing means flows to the humidifying means; wherein the water passage is provided with a base portion, an apex portion which is positioned higher than the base portion, and an orthogonal portion which is higher than the base portion and connects the base portion and the apex portion;
water removing means for supplying purge gas to the water passage so as to remove the water in the water passage; the water removing means comprising a supply port which is supplied with purge gas and is disposed on the apex portion;
water recirculating means for enabling the passage of water through the water passage, the water recirculating means being disposed on the water passage;
shutoff valve means for blocking the water passage such that water from the water storing means does not flow into the water recirculating means, the shutoff valve means being provided between the water storing means and the water recirculating means;
a water suction outlet for introducing water from the water storing means into the water passage, the shutoff valve means being disposed in a higher position than the water suction outlet; wherein the water suction outlet is connected to the base portion of the water passage, the base portion being positioned at the substantially same level as the water suction outlet;
purge gas releasing means for releasing purge gas from the water passage, the purge gas releasing means connecting to the apex portion of the water passage and comprising a release pipe through which purge gas flows and a gas release valve positioned on the release pipe;
water passage temperature detecting means for detecting a temperature of the water in the water passage further toward the water tank side than the shutoff valve means;
purge gas release pipe temperature detecting means disposed in the vicinity of the purge gas release valve;
first control means for controlling the shutoff valve means to open when a shutdown operation of the fuel cell system begins;
second control means for controlling the water removing means to start a supply of purge gas to the water passage when the shutdown operation of the fuel cell system begins;
third control means for controlling the shutoff valve means to block the water passage after a predetermined time period has elapsed following the start of the supply of purge gas; and
fourth control means for controlling the water removing means to halt the supply of purge gas after the water passage has been blocked by the shutoff valve means; wherein purge gas is sealed between the shutoff valve and the water surface of the water which returns to the water passage from the water tank after the shutoff valve has blocked the water passage;

fifth control means for controlling the purge gas releasing means to release purge gas from the water passage when a startup operation of the fuel cell system begins;

comparing means for comparing a temperature detected by the purge gas pipe temperature detecting means with a temperature detected by the water passage temperature detecting means; and stopping means for stopping the release of purge gas by the purge gas releasing means when it is determined that the temperature detected by the purge gas pipe temperature detecting means and the temperature detected by the water passage temperature detecting means are substantially equal.

\* \* \* \* \*